(12) United States Patent
van Oers et al.

(10) Patent No.: US 6,712,140 B2
(45) Date of Patent: Mar. 30, 2004

(54) 3RD BOREHOLE RADAR ANTENNA AND ALGORITHM, METHOD AND APPARATUS FOR SUBSURFACE SURVEYS

(75) Inventors: Michiel Sebastiaan van Oers, Utrecht (NL); Koen Willem Anton van Dongen, Leiden (NL); Petrus Maria van den Berg, Pijnacker (NL); Jacob Tjeerd Fokkema, Schiedam (NL); Robert van Ingen, Noordwijk (NL); Neil Vladimirovich Budko, Delft (NL); Robert Frans Remis, Rotterdam (NL)

(73) Assignee: T & A Survey B.V., Amsterdam (NL)

( * ) Notice: Subject to any disclaimer, the term of this patent is extended or adjusted under 35 U.S.C. 154(b) by 0 days.

(21) Appl. No.: 10/312,774

(22) PCT Filed: Jul. 5, 2001

(86) PCT No.: PCT/NL01/00509
§ 371 (c)(1),
(2), (4) Date: Dec. 30, 2002

(87) PCT Pub. No.: WO02/04987
PCT Pub. Date: Jan. 17, 2002

(65) Prior Publication Data
US 2003/0089494 A1 May 15, 2003

(30) Foreign Application Priority Data

Jul. 7, 2000 (NL) ............................................. 1015651
Sep. 15, 2000 (NL) ............................................. 1016200
Oct. 9, 2000 (NL) ............................................. 1016363

(51) Int. Cl.[7] ............................................... E21B 49/00

(52) U.S. Cl. .............................. 166/250.16; 166/254.2; 702/8; 324/346; 73/152.35; 342/153

(58) Field of Search ....................... 166/250.01, 250.16, 166/254.2; 702/8, 11; 324/346; 73/152.35; 342/22, 153

(56) References Cited

U.S. PATENT DOCUMENTS 4,045,724 A 8/1977 Shuck et al.
4,297,699 A * 10/1981 Fowler et al. ................. 342/22

(List continued on next page.)

FOREIGN PATENT DOCUMENTS

EP 0 349 110 A2 5/1989
EP 0 729 039 A2 1/1996

(List continued on next page.)

OTHER PUBLICATIONS

Kotre C.J: "Detection of sub-surface objects by electrical impedance tomography" Eurel International Conference.

(List continued on next page.)

*Primary Examiner*—Roger Schoeppel
(74) *Attorney, Agent, or Firm*—Brooks Kushman P.C.

(57) ABSTRACT

The invention relates to a borehole radar tool comprising, in a housing (2) a transmitting antenna and a receiving antenna both of which comprise, near the housing wall (2), a dipole antenna (8) and a reflector (10) opposite thereto. Also provided are an algorithm, method and apparatus for determining electromagnetic contrast information of a site into which electromagnetic fields (27) are emitted. Signals (29) generated by induction are intercepted and, using a back-projection algorithm including a suitable weighting factor, are converted into contrast information. The algorithm and/or method can be recorded in a computer program or on a data carrier. Also disclosed is a method of determining said weighting factor. The invention further provides a method and apparatus for subsurface surveys in which electromagnetic pulse signals are emitted. All the necessary response signal samples are taken from each response signal received, and these are converted into a response signal word in order to characterize the response signal. Successive response signal words are buffered to form a data word in order to provide an image of the subsurface structure.

11 Claims, 8 Drawing Sheets

U.S. PATENT DOCUMENTS

| | | | |
|---|---|---|---|
| 4,430,653 A | | 2/1984 | Coon et al. |
| 4,670,717 A | * | 6/1987 | Sender .................. 324/338 |
| 4,689,569 A | * | 8/1987 | Duff ...................... 324/338 |
| 4,940,943 A | | 7/1990 | Bartel et al. |
| 5,113,192 A | | 5/1992 | Thomas |
| 5,134,884 A | | 8/1992 | Anderson |
| 5,471,435 A | | 11/1995 | Marschall |
| 5,530,359 A | | 6/1996 | Habashy et al. |
| 5,995,905 A | | 11/1999 | Ikelle et al. |
| 6,005,916 A | | 12/1999 | Johnson et al. |
| 6,556,014 B1 | * | 4/2003 | Kong et al. ............ 324/338 |
| 6,593,746 B2 | * | 7/2003 | Stolarczyk ............. 324/334 |

FOREIGN PATENT DOCUMENTS

| | | |
|---|---|---|
| EP | 0 816 872 A1 | 6/1996 |
| GB | 1532710 | 6/1976 |
| GB | 2100544 | 6/1981 |
| GB | 2091513 A | 10/1981 |
| WO | WO 89/03053 | 9/1988 |
| WO | WO 97/42518 | 5/1997 |
| WO | WO 99/35515 | 7/1999 |

OTHER PUBLICATIONS

The Detection of Abandoned Land Mines: A Humanitarian Imperative Seeking a Technical Solution (Conf. Publ. No. 431), Eurel International Conference the Detection of Abandoned Land Mines: A Humanitarian Imperative Seeking, bladzijden 67–71, XP 002169110 1996, London, UK, IEE, UK ISBN: 0–85296–669–5.

Kotre, C.J. "Subsurface Electrical Impedance Imaging Using Orthorgonal Linear Electrode Arrays" IEE Proceedings: Science, Measurement and Technology, IEE, Stevange, Herts, GB, deel 143, nr. 1, Jan. 16, 1996, bladzijden 41–46, XP 006006750 ISSN: 1350–2344, bladzijde 42, alinea 3, bladzijde 44, alinea 6.

IEEE Transactions on medical imaging, vol. 13 No. 1, Mar. 1994 Title: "Weighted backprojection approach to cone beam 3D projection reconstruction for truncated spherical detection geometry." Authors: Zang Hee Cho, Ed. X. Wu and Sadek K. Hilal.

IEEE Transactions on nuclear science, vol. 35 No. 1, Feb. 1988 Title: "Weighted backprojection implemented with a non–uniform attentuation map for improved SPECT quantitation." Authors: S.H. Manglos, R.J. Jaszczak and C.E. Floyd.

* cited by examiner

Fig. 9

3RD BOREHOLE RADAR ANTENNA AND ALGORITHM, METHOD AND APPARATUS FOR SUBSURFACE SURVEYS

BACKGROUND OF THE INVENTION

1. Field of the Invention

The present invention, according to a first aspect thereof, relates to a borehole radar tool for directionally sensitively locating transitions in the subsurface surrounding the borehole radar tool in use, comprising a generating assembly for generating the electromagnetic radiation having a frequency of between 10 MHz and 200 MHz, signal processing means for processing the received electromagnetic radiation, and a housing having a substantially cylindrical wall and a central axis which accommodates at least:

- a transmitting antenna assembly for emitting the electromagnetic radiation generated by the generating assembly, comprising a transmitting antenna and an electroconductive reflector; and
- a receiving antenna assembly for receiving the electromagnetic radiation reflected by the surrounding subsurface, comprising a receiving antenna and an electroconductive reflector, wherein both the transmitting antenna and the receiving antenna extend parallel to the axis of the housing and both comprise a dipole antenna, each reflector comprising a reflective surface which extends abreast of and parallel to the respective dipole antenna at a distance therefrom, and the space between each reflective surface and that section of the housing which in each case is located opposite thereto being filled with a medium having a dielectric constant of at least 10.

2. Background Art

A borehole radar tool of this type is described in WO-A-89/03053. This publication describes a radar instrument for use in a borehole for locating fractures in a geological formation, comprising directionally sensitive transmitting and receiving antennae. Emitting means generate a pulsed radar signal with an output in the frequency range of between 30 and 300 MHz. This signal is radiated via a reflector, in particular a reflector consisting of two electroconductive plates arranged in the shape of a V. A receiving antenna, provided with a similar reflector, is used to intercept the radar signal reflected by the formation. The space through which the radiation propagates within the housing is filled with a barium titanate powder/air mixture, whose dielectric constant matches that of the surroundings and in particular has a value of about 80.

Using a borehole radar tool of this type, it is possible to achieve a certain directional sensitivity. With many applications there is a need for both the highest possible directional sensitivity and for as much radiation as possible penetrating into the subsurface. Given the constraints to which borehole radar tools are subject, including a preferred diameter of at most 20 cm and the electromagnetic characteristics of the subsurface to be surveyed, it has so far not proved possible to increase the directional sensitivity.

SUMMARY OF THE INVENTION

The object of the first aspect of the present invention is to provide a solution to the abovementioned problem, said aspect being characterized, to this end, in that the transmitting antenna and receiving antenna extend near the wall of the housing and in that at least that section of the reflector which is located diametrically opposite the transmitting antenna and receiving antenna, respectively, likewise extends near the wall of the housing.

Using a borehole radar tool of this type, it is possible to achieve a higher directional sensitivity in conjunction with high power of radiation penetrating into the subsurface. Two variables have to be considered in this context. The first variable is the ratio between the emitted power in the target direction and the emitted power in the other direction(s). This ratio should be as large as possible. The second variable is the total power emitted in the target direction. Obviously, this should be as large as possible. This is desirable to achieve the highest possible penetrative power. Thus a good image of the subsurface can be obtained with as small a number as possible of expensive boreholes.

A configuration according to the first aspect of the invention was found to function satisfactorily. In such an arrangement, the reflector should have a certain surface area. In practice, optimal dimensions exist for the reflector, which predominantly depend on the constrained dimensions of the housing.

The first aspect of the invention provides, in addition, for the distance from the transmitting and/or the receiving antenna to the reflective surface to be as large as possible. This is achieved by means of a borehole radar tool according to the first aspect of the invention. The term "distance" in this context refers to the mean distance between the reflective surface and the transmitting or receiving antenna.

The term "near the wall of the housing" in this context means that the relevant section of the reflector, or the centre of the transmitting and/or the receiving antenna, respectively, is located at a distance from the inner wall of the housing which is at most a quarter of the inside diameter of the housing. In particular, the distance between the inner wall of the housing and the relevant section of the reflector, or the transmitting and/or the receiving antenna, respectively, is at most 2 cm, advantageously less than 1 cm. Thus, as large a distance as possible between antenna and reflective surface can be achieved in a simple manner. In special conditions, for example at very high frequencies and when the apparatus is filled with a dielectric having a very high dielectric constant, the distance can alternatively be greater than 2 cm.

In a particular embodiment, at least one of the reflectors forms part of the wall of the housing. Thus it is possible for the dimensions of the housing, i.e. of the borehole, to be optimally utilized to the advantage of the reflector. For example, the housing is fashioned as a cylinder from a nonconductive material, for example plastic, part of the cylinder being formed by the reflector section which is fabricated from metal, for example.

In another embodiment, at least one of the reflectors comprises a thin plate. In this embodiment, a narrow space exists between the reflector and the housing, said space accommodating, for example, the cabling to the transmitting and/or receiving antenna. It is important for said cabling to be screened against electromagnetic radiation present in the space between the reflective surface and that section of the wall of the housing which is situated opposite thereto. The reflector can serve as such a screen.

The shape of the reflector, and in particular of the reflective surface, is not subject to any particular constraint. Suitable, for example, are two straight plates touching one another at one end, each end of both plates being situated near the wall of the housing. This affords a V-shaped reflector.

Advantageously, at least one reflective surface is a substantially smoothly curved surface which, as seen in the axial direction of the housing, at least substantially forms part of a conic. Giving the reflective surface such a shape makes it possible to ensure that the reflective surface at least largely follows the shape of the wall of the housing, thus making the mean distance from the reflector to the transmitting and/or receiving antenna as large as possible.

The term "substantially smoothly curved" in this context means that it is acceptable for the reflective surface to exhibit deviations in its shape whose dimensions are much smaller than the wavelength used, in particular at most 1/10 of the wavelength of the electromagnetic radiation. Owing to the wave properties of the electromagnetic radiation, the reflective surface will then still appear to be smoothly curved. Examples of such deviations in shape are holes for wiring, or bending edges in a faceted reflector.

The conic is preferably chosen to be as advantageous as possible. Advantageously, the conic is a circle having a radius which is substantially equal to half the inside diameter of the housing. In this way, it is ensured that the mean distance between the reflective surface and the transmitting and/or receiving antenna is at its maximum. If the reflective surface is formed by the inner wall of the housing, the radius of the circle is equal to half the inside diameter of the housing. If the reflector is a thin plate near the inner wall of the housing, the radius of the circle is equal to half the inside diameter of the housing minus the thickness of the plate, possibly reduced by the distance between plate and inner wall of the housing. In particular, the last mentioned distance is less than 2 cm, advantageously less than 1 cm.

Advantageously, the angle formed by at least one of the reflectors is between 45° and 180°. If said angle is between these two limits, a satisfactory emission characteristic is obtained owing to the reflective surface being large enough without too much radiation being lost via reflection of the emitted or intercepted radiation in a direction other than the desired one.

More advantageously, the angle formed by at least one of the reflectors is between 145° and 155°. At these angles, an even better emission characteristic and consequently a better directional sensitivity is obtained.

In another preferred embodiment, the conic is a parabola. In particular, the focal length of the parabola is between 0.5 and 0.75 times the inside diameter of the housing. In many cases the centre of the transmitting and/or receiving antenna is in the focal point of the parabola, but it was found that it is more important for the distance between reflective surface and transmitting and/or receiving antenna to be as large as possible.

In the borehole radar tool according to the first aspect of the invention, the space between the reflective surfaces and that section of the wall of the housing which in each case is situated opposite thereto is filled with a dielectric. The function of the dielectric is, on the one hand, to shorten the wavelength of the electromagnetic radiation in the region between the antennae and the reflective surface. This results in an improvement of the collimating characteristics of the reflective surface. For this purpose, the dielectric constant of the dielectric is in principle chosen to be as large as possible.

On the other hand, the value of the dielectric constant of the dielectric at the transition towards the surrounding subsurface must match the value of the dielectric constant of that subsurface. The dielectric constant of, for example, the Dutch subsurface varies between ±5 (dry sand) and ±40 (wet sand, clay), and ±80 for water (e.g. groundwater). The smaller the difference in the dielectric constant between the subsurface and the dielectric, the larger the proportion of the generated electromagnetic radiation which actually penetrates the subsurface. This is desirable in order to be able to sample as large a proportion of this subsurface as possible by means of one measurement. With high penetrative power, measurements can extend to large distances, thereby requiring relatively few expensive boreholes. In such an arrangement, that fraction of said space which adjoins the wall of the housing can be filled with a suitable dielectric. In practice, the space between the reflective surfaces and that part of the wall of the housing which in each case is situated opposite thereto can be completely filled with one dielectric.

Preferably, the dielectric in the space between the reflective surfaces and that section of the wall of the housing which in each case is located opposite thereto has a dielectric constant of between 20 and 100, and more preferably between 60 and 100 and most preferably of about 80. At these values for the dielectric constant, a satisfactory compromise is achieved between suitable wavelength shortening for good collimating characteristics and a large proportion of radiation penetrating into the subsurface.

In a particular embodiment of the borehole radar tool according to the first aspect of the invention, the dielectric substantially comprises water. Of all the dielectric materials having a dielectric constant of about 80, water is particularly suitable, but e.g. barium titanate/air mixtures, as disclosed in WO-A-89/03053 will likewise be quite satisfactory.

The present invention, according to a second aspect thereof, generally relates to determining electromagnetic contrast information of an object.

With the aid of electromagnetic contrast information, it is possible to determine transitions in the electromagnetic properties of a site. Such transitions may, for example, indicate fractures or discontinuities, the presence of a material having different electromagnetic properties or other changes in the composition of the site.

The site referred to within the scope of the second aspect of the present invention is not subject to any restrictions in terms of its nature. In particular, however, site here refers to either (a section of) the ground or a pipeline at least partly made of metal. In the case of the ground, the electromagnetic contrast information observed can be used to locate buried objects or, for example, minerals such as oil, while in the case of the pipelines, the information can be used, for example, to determine where corroded patches are located and how thick these are, or where joints of pipe sections are located.

The determination of electromagnetic contrast information is often carried out with the use of geophysical imaging methods. Geophysical imaging methods frequently make use of a so-called subsurface measuring device. Subsurface measuring devices in this context refer to devices which are able to generate electromagnetic fields or to emit electromagnetic radiation which penetrates into the surrounding subsurface. Electromagnetic fields in this context should be understood to comprise either purely electric or alternatively magnetic fields. A fraction of the electromagnetic fields of radiation which is reflected by the subsurface and especially by the electromagnetic transitions located therein or, in the case of electromagnetic fields, is generated by induction in an underground electromagnetic transition or object and is then emitted, can be intercepted by the subsurface measuring device and be recorded in the form of a number of output signals. After a number of output signals have been collected, it is possible, by processing them, to obtain an image of the contrast characteristics of the surveyed section of the ground. Examples of subsurface measuring devices are subsurface radars, borehole radar tools and so-called NanoTEM measuring devices, which are known per se.

The measured data thus obtained can be divided into two groups. The first group is sometimes referred to as "wave data". These arise from situations in which the electromagnetic fields or radiation propagate within the surrounding subsurface in a wave-like manner. The electromagnetic energy then has a wave character.

The second group is sometimes referred to as "diffusion data". These arise from a situation in which the electromagnetic field diffuses within the medium, as is also the case, for example, with heat. The electromagnetic energy then has a field character. In this case the field ensures that electromagnetic transitions or objects located in the subsurface will reflect or, via induction, emit radiation, in other words will form secondary field or radiation sources.

In processing wave or diffusion data, use is made of algorithms which likewise can be divided into two groups which, in principle, can both be applied to both wave data and diffusion data.

The first group of algorithms can be designated by the name "inversion" algorithms. This group of algorithms addresses the simultaneous determination of the shape and location of the object or the subsurface transition and of the unknown electromagnetic parameters.

The second group of algorithms is in fact referred to by the name "imaging" algorithms. This group of algorithms is able only to reconstruct the shape and the location of the electromagnetic transition. Particularly when these are applied to diffusion data, what is really determined is the shape and the location of the secondary field or radiation sources which in turn form an indication for the electromagnetic transitions in the subsurface. The processing speed and the mathematical stability of the imaging algorithms is greater than that of the inversion algorithms. The imaging algorithms are therefore used on a large scale.

The second aspect of the present invention relates, more in particular, to an algorithm for use in determining electromagnetic contrast information in a site according to the preamble of claim 12.

An algorithm of this type is often referred to by the name "back-projection" algorithm and is described, for example, in U.S. Pat. No. 6,005,916.

The back-projection algorithm is widely used as an imaging algorithm in the processing of wave data. The back-projection algorithm essentially consists of the application, to measured data, of the adjoint integral operator linearized with the aid of Born's approximation.

This algorithm is simple and therefore also efficient. However, it results in incorrect imaging if it is applied unmodified to diffusion data. The position of the object is not reproduced correctly, said position, in particular, being shown too close to the surface of the site, i.e., for example, too close to the earth's surface or the outer surface of the pipeline.

For diffusion data, the back-projection algorithm can therefore not be applied in the conventional form. Use must be made of computation-intensive inversion algorithms. Imaging with the aid of such an inversion algorithm is much more sensitive to noise and, because of the computational capacity required, not (readily) possible in three dimensions.

It is therefore an object of the second aspect of the present invention to provide a solution to the abovementioned problem. This object is achieved with the aid of an algorithm as described in claim 12.

The E-function described in claims 12–19 represents a Green function of the complex propagation function $\gamma(\omega_j)$. The propagation function describes how the electromagnetic field varies, both in terms of (field) strength and phase angle, as a function of the (angular) frequency $\omega_j$. The mentioned constant C1 is usually set equal to $1/(16 \cdot \pi^2)$.

By making suitable use of a weighting factor, it is possible to correct most of the imaging aberrations. For the first time, therefore, accurate imaging becomes possible making use of a back-projection algorithm in the case of imaging on the basis of diffusion data.

The weighting factor W should be chosen such that the shape and location of transitions or objects (in fact the secondary field or radiation sources) found with its aid correspond to the actual shape and location of the transitions and the objects. A procedure for achieving this will be described later.

It is possible that a different value for the weighting factor W will have to be used for each combination of values for $x^s_m$, $x^r_n$, x' and $\omega_j$. In other words, W is a function of these variables. The mathematical dependence of the weighting factor W as a function of $x^s_m$, $x^r_n$, x' and $\omega_j$ is constrained solely, in principle, by the purpose to be achieved. In addition, the weighting factor W can depend on the type of the measuring device used, on the base material of the surveyed site and possibly also on other conditions.

In a particular embodiment of the algorithm according to the invention, the weighting factor W, for at least some of the values of $x^s_m$, $x^r_n$, x' and $\omega_j$, substantially takes the form $$W(x^s_m, x^r_n, x', \omega_j) = C2 \cdot (|x^s_m - x'| \cdot |x' - x^r_n|)^{nd} \cdot (\gamma(\omega_j))^{n\gamma},$$

where

C2 is a constant, nd is a real number between −2 and +5, and nγ is a real number between −4 and +4.

Experiments have shown that the mathematical form of the weighting function depends solely on the type of measuring device and not on the characteristics of the experimental data. It is therefore possible, for each type of measuring apparatus, with the aid of a few simple experiments as will be described hereinafter in detail, to determine in a suitable manner a weighting function W of the above-described form.

In a preferred embodiment, $n_d$ is between 2.5 and 3.5, and nγ is between 1.5 and 2.5. More preferably, $n_d$ equals 3 and $n_\gamma$ equals 2. This form of the weighting function is suitable, for example, for so-called NanoTEM equipment. In a similar manner, a suitable weighting factor W can be chosen for other measuring equipment.

The invention also relates to the use of an algorithm according to the second aspect of the invention in the determination of electromagnetic contrast information of a site with the aid of measurements using electromagnetic fields or radiation. To this end, the algorithm can be held in compiled or uncompiled form in the memory of an electronic arithmetic unit or be recorded on a carrier of digital data, such as a diskette, magnetic tape or hard-disk unit. It is also possible to process the data by means other than an electronic arithmetic unit, for example by hand. From an efficiency point of view, the latter is not recommended.

According to the second aspect, the invention further relates to a method of determining electromagnetic contrast information of a site according to claim 16.

Preferred embodiments of the method according to the second aspect of the invention are described in claims 17 and 18.

Additionally, the invention according to the second aspect relates to a method of determining the weighting factor W applicable to a measuring device, as described in claim 19. The term measuring device here relates to a measuring device for determining electromagnetic contrast information, for example a subsurface measuring device or a pipeline measuring device.

In practice, for example, if a subsurface measuring device is to be tuned, a known object is buried in a test field at a known position, or the electromagnetic characteristics of the soil of the test field in question are known by some other way known in the prior art. This method according to this second aspect of the invention then involves, first of all, a determination, by means of the subsurface measuring device, of the electromagnetic experimental values of the soil of the test field. Then values are chosen for the numbers nd and nγ of the weighting factor W on the basis of experience or expectation. With the aid of the weighting factor W thus chosen, the experimental values are processed to yield the contrast information and thus an image of the soil including the shape and the location of the buried object.

If the observed values for the shape and the location of the buried object do not correspond to the actual situation, that is not with the desired accuracy, the weighting factor W is attuned to reality via a choice of other, more suitable values for the numbers nd and nγ. Then the experimental values are again processed to yield electromagnetic contrast information and therefore an image of the soil. This image is again compared with reality.

Should the observed image still not correspond, with the desired accuracy, with reality, the values of nd and nγ are again adjusted, the measured values are processed etc., until the desired accuracy has been achieved. It should be noted that there are limits to the accuracy that can be achieved by this procedure. In fact, a separate weighting factor should be determined for each point to be surveyed in the site, for each source position, for each receiver position and for each frequency used, said weighting factors together forming an extremely complicated function. In practice this is not feasible. This method provided according to the second aspect of the invention provides the option of finding a good approximation to this weighting function in a simple manner.

In a comparable manner, a method of this type can be used for determining, for example, the position and thickness of any corroded patches or other discontinuities in a pipeline which is at least partly made of metal. To this end, the position and thickness of corroded patches, i.e. the electromagnetic contrast characteristics, in the pipeline are determined beforehand in some other way known in the prior art. Then the pipeline, which may or may not be buried, is surveyed by means of the measuring device, the weighting factor W being adjusted in the process until the observed contrast characteristics or corroded patches correspond to those known.

According to the second aspect, the invention further provides measuring devices for determining, with the aid of electromagnetic radiation or fields, electromagnetic contrast information of a site as described in claims 20 and 21.

In a preferred embodiment of the measuring device according to the second aspect of the invention, the weighting factor W used for that measuring device is determined making use of a method suitable therefor according to the second aspect of the invention. The weighting factor W found can be applied by using a separate electronic arithmetic unit to process the measured data determined by the measuring device. Alternatively, it is possible for the processing of the measured data with the aid of the weighting factor to be performed by an electronic arithmetic unit integrated in the measuring device. This permits an in situ judgement on whether supplementary measurements are necessary. As a result, the entire system becomes more flexible and more efficient.

The second aspect of the invention also relates to a computer program which can be loaded into a computer, such that the computer thus programmed is suitable for performing an algorithm according to the invention.

Moreover, the invention according to its second aspect relates to a computer program which can be loaded into a computer, such that the computer thus programmed is suitable for implementing a method of determining electromagnetic contrast information according to the second aspect of the invention.

In this context, it is possible for the further processing of the observed data likewise to be carried out with the aid of modules of the computer program which are suitable for this purpose. Thus, the observed data could be represented in a suitable form on a monitor or in the form of a printout.

According to its second aspect, the invention also relates to a computer program product according to claim 25 or claim 26. It involves a computer program product on which a computer program for performing an algorithm in, or a method of, determining electromagnetic contrast information according to the second aspect of the invention is recorded. This computer program product can, for example, comprise a magnetic tape, a diskette, a hard-disk unit, CD-ROM. In another embodiment, the computer program product comprises part of the read-only, non-erasable memory section of a computer or subsurface measuring device, one possible option being a so-called plug-in card.

The invention, according to the second aspect, further relates to the use of a computer program according to the second aspect of the invention. One possible option involves loading and subsequently using a computer program according to the second aspect of the invention in a computer or in a subsurface measuring device.

Another conceivable possibility would be to dispatch unprocessed measured data from a particular location to some other location where a computer program according to the second aspect of the invention has been loaded into a computer. There, the unprocessed data are processed with the aid of the computer program according to the second aspect of the invention, following which the process data can be dispatched to the location where they are required.

Transmission of the unprocessed and/or the processed data can be effected in a variety of ways. For example, the data can be recorded on an information carrier such as a magnetic tape, diskette or CD-ROM, which is then dispatched. It is also possible to dispatch the data, in digitized form or otherwise, via a network such as a telephone line or the internet.

A third aspect of the invention relates to a method of carrying out a subsurface survey, comprising the steps of generating one or more electromagnetic pulse signals, emitting the one or more pulse signals into the subsurface, receiving one or more response signals associated with each pulse signal, sampling the one or more response signals, converting each response signal sample into digital form in order to obtain a response signal word, and processing the response signal words to obtain an image of the structure of the subsurface. The invention, according to its third aspect, also relates to an apparatus for implementing this method.

A method of this type is known from the prior art, for example from International Patent Application PCT/US88/

03196. Owing to limits to the speed of equipment (A/D converter) for converting an analog response signal value into a digital response signal value, and also owing to limits to the speed of equipment for processing the digital response signal words, the known method involves subsampling. Said subsampling implies that one sample is taken of each response signal of a series of successive response signals, the sampling period being somewhat larger than the response signal period. The series of response signal samples thus obtained forms a complete sample of one of the response signals, faithfully reproducing the original analog response signal. Said subsampling makes it possible to sample a high-frequency signal at a low frequency, thus enabling processing of the response signal words to be performed within the technical capabilities of the available equipment.

In principle, the electromagnetic pulse signals can be emitted into the subsurface both from the surface (above water or under water) and from a hole in the subsurface. The response signals can likewise be received both at the surface (above water or under water) and in the hole in the subsurface.

The known method has a number of drawbacks.

A first drawback is that a complete series of response signal samples can only be obtained on the basis of a large number of response signals, at a relatively high cost in terms of time and energy, since each response signal sample requires a pulse signal, resulting in a response signal, to be emitted into the subsurface.

A further drawback is that the successive response signals, of each of which one sample has to be taken each time, must be identical to a high degree, which in turn places high requirements on the uniformity of the pulse signals which give rise to the response signals, if it is assumed that the characteristics of the subsurface will not change during the time required for the series of response signal samples. At the same time, the repeat frequency of the pulse signals should be highly constant or at least be synchronized with the sampling frequency.

Another drawback is that the A/D converter of the known device performs sampling which is independent of the amplitude of the response signal, which means that for small amplitudes the amplitude accuracy obtained is relatively poor, thereby impairing the quality of the subsurface structure image ultimately aimed for.

If a higher accuracy, (e.g. 16 or 32 bits) is desired, which will generally be the case, the conversion rate of the A/D converter available for this purpose decreases, which results in the need for the abovementioned subsampling. Conversely, a relatively high conversion rate results in a relatively low accuracy (e.g. 8 bits).

It is an object of the third aspect of the invention to eliminate the abovementioned drawbacks or at least considerably reduce them. This object is achieved by a method of the above-specified type, which is characterized according to claim 27. An apparatus according to the third aspect of the invention is characterized according to claim 31.

In the method and apparatus according to the third aspect of the invention, a plurality of sampling operations are performed for each response signal, fewer response signals therefore being required to obtain a complete series of samples which adequately describe a response signal. Preferably, all those response signal samples are taken from each response signal that are necessary for a substantially complete characterization of the response signal. This permits very high savings in time and energy. Moreover, it is not necessary for the pulse signals to be uniform relative to one another or for the repeat frequency of the pulse signals to be constant or to be synchronized with the sampling frequency.

To allow the response signal words to be processed at a lower rate despite the high sampling frequency chosen, a number of successive response signal words are buffered to form a data word, the data word subsequently being processed to obtain an image of the structure of the subsurface.

In a preferred embodiment of the method and apparatus according to the third aspect of the invention, the amplitude of each response signal while being received is adjusted to the maximum amplitude applicable to the sample, which means that good amplitude accuracy is achieved even at high conversion rates and/or with A/D converters having limited accuracy for relatively small amplitudes.

BRIEF DESCRIPTION OF THE DRAWINGS

The various aspects of the invention will be explained below in more detail with reference to the following description of the figures with reference to the drawing, in which.

In the various figures, identical reference numerals relate to identical components or components having identical functions.

Figure 1:
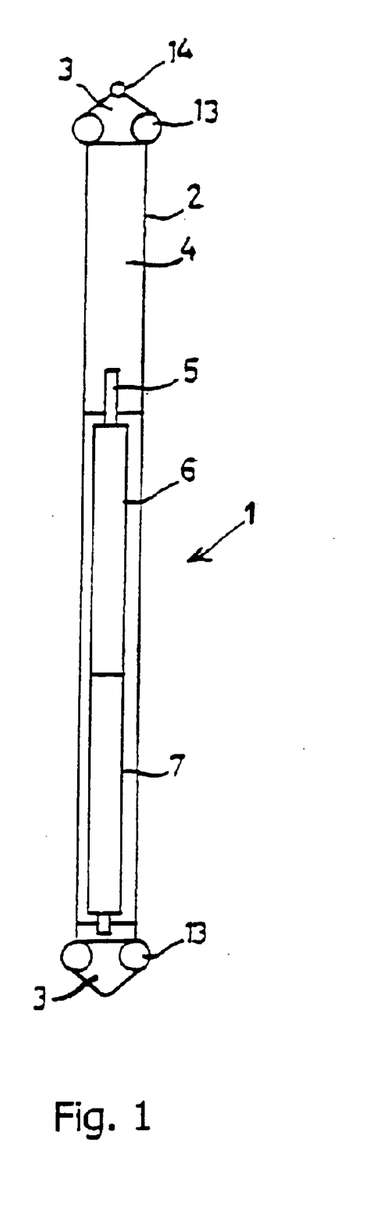
FIG. 1 shows a schematic section through a borehole radar tool according to the first aspect of the invention.

In FIG. 1, 1 indicates a borehole radar tool according to the first aspect of the invention. This comprises a housing 2 which, at its top and bottom, is sealed with the aid of sealing components 3. The sealing components 3 are provided, for example, with wheels 13 to guide the borehole radar installation within a borehole. The top sealing component 3 is provided with a hoisting eye 14, by means of which the borehole radar installation 1 can be moved upwards or downwards.

4 indicates a part not elaborated in any detail, which may include, for example, control electronics, as well as means by which antenna components are rotated within the housing, and gyroscopes for determining the orientation of the antenna components.

5 indicates a shaft about which a transmitting antenna assembly 6 and a receiving antenna assembly 7, respectively, are able to rotate. With the aid of such rotation, the borehole radar tool can perform a measurement in the desired direction.

When using the borehole radar tool 1 according to the first aspect of the invention, measurements can be carried out, for example, as follows. The borehole radar tool 1 is introduced into a borehole, being connected to control means which allow it to be controlled from ground level. At a particular depth, the orientation of the borehole radar tool 1 with respect to the earth is determined. A measuring cycle then commences by emitting electromagnetic radiation and intercepting the reflected radiation and recording it in the form of a signal. This is followed by the transmitting antenna assembly 6 and the receiving antenna assembly 7 being rotated by a small angle, e.g. 2° or 3°, and a next measurement then being carried out. These steps are repeated until a measurement has been carried out in all the desired directions. Then, the borehole radar installation 1 is moved to a different depth, whereupon all the abovementioned steps are repeated.

Alternatively, however, the borehole radar tool can be equipped so as to be capable of autonomous measurement and movement. This will then require, for example, an energy source such as a battery, propulsion means such as an electrically operable cable reel, and built-in control means such as a control and measuring program to be provided.

This allows an electromagnetic profile to be determined of a particular area around a borehole. The profile consists of a number of transitions in the subsurface where the electromagnetic characteristics change. This may indicate a fracture in the subsurface, a change in composition (e.g. bituminous coal, oil), but also the presence of an object such as an unexploded bomb. Evaluation and interpretation of the data can be carried out subsequently.

The borehole radar tool 1 according to the first aspect of the invention can be used in a variety of fields: the exploration of the environment of boreholes for the purpose of, for example, digging activities or extraction of minerals, tracing of objects present in the subsurface such as unexploded bombs or shells etc. The borehole radar installation can be adapted according to the desired application and the subsurface in which the measurements are to be carried out.

One example of this is the possibility of choosing a different frequency range for the emitted electromagnetic radiation. E.g. a lower frequency generally provides a larger penetrative power but lower resolution. The penetrative power also depends on the subsurface characteristics. If the subsurface is highly penetrable, for example sand above the groundwater table, it is possible to opt for an increase in frequency in order thus to increase the resolution. Again, however, the fact is that given the cost of boreholes, the emphasis in the first instance is on penetrative power. Only in special cases, therefore, will the frequency be increased. Consequently, the frequency used is preferably between 20 and 200 MHz.

In addition, some dielectric other than water can be chosen if appropriate. E.g. the dielectric constant of a sand soil above the groundwater table (dry sand) is considerably lower than that of water-saturated sand. A lower value must therefore be chosen for the dielectric constant of the filling dielectric in order to retain sufficient emitted power. This does result in an increase in the wavelength of the electromagnetic radiation within the housing, adversely affecting the collimating characteristics of the reflector. This can be resolved, for example, by using a higher frequency. Whilst the penetrative power of electromagnetic radiation generally decreases with increasing frequency, this effect is compensated for by the better penetration characteristics in sandy soils. Another option is to adjust the shape and/or dimensions of the reflector.

Figure 2:
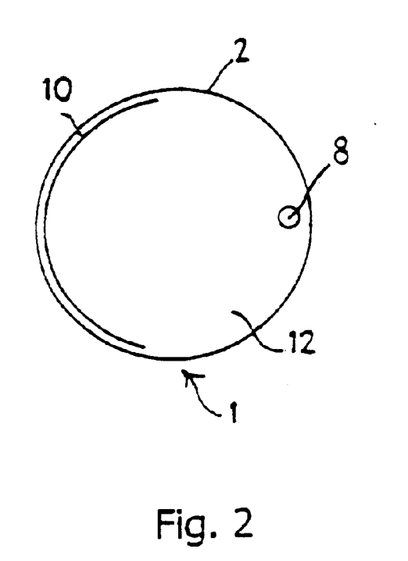
FIG. 2 shows a schematic cross section of a borehole radar tool according to the first aspect of the invention.

FIG. 2 depicts a schematic cross section of an antenna component. Lying against the housing 2 is a dipole antenna 8. Situated diametrically opposite thereto is a reflector 10 in the form of an almost semicircular electroconductive plate. The space between the reflector 10 and the antenna 8 is filled with water.

The antenna 8 here is not located in the focal point of the reflector 10. This means that no substantially parallel radiation can be obtained. It should be noted in this context that in the case of cylindrical reflectors, the centre is regarded as the focal point, although strictly speaking this applies only to a small portion of the reflector and even then only by approximation. In most borehole radar installations, however, the wavelength used is of the same order of magnitude as the diameter of the borehole radar installation or as the dimension of the reflector. As a result of the distance between antenna 8 and reflector 10 being larger than the distance in the case where the transmitter would be located in the focal point of reflector 10, the adverse effects of the off-focus position are more than compensated for by the increased distance.

Preferably, the reflectors of the transmitting and receiving section, respectively, are not earthed. This minimizes any problems, especially with the receiving section, given the minimal coupling with the transmitting section.

Figure 3:
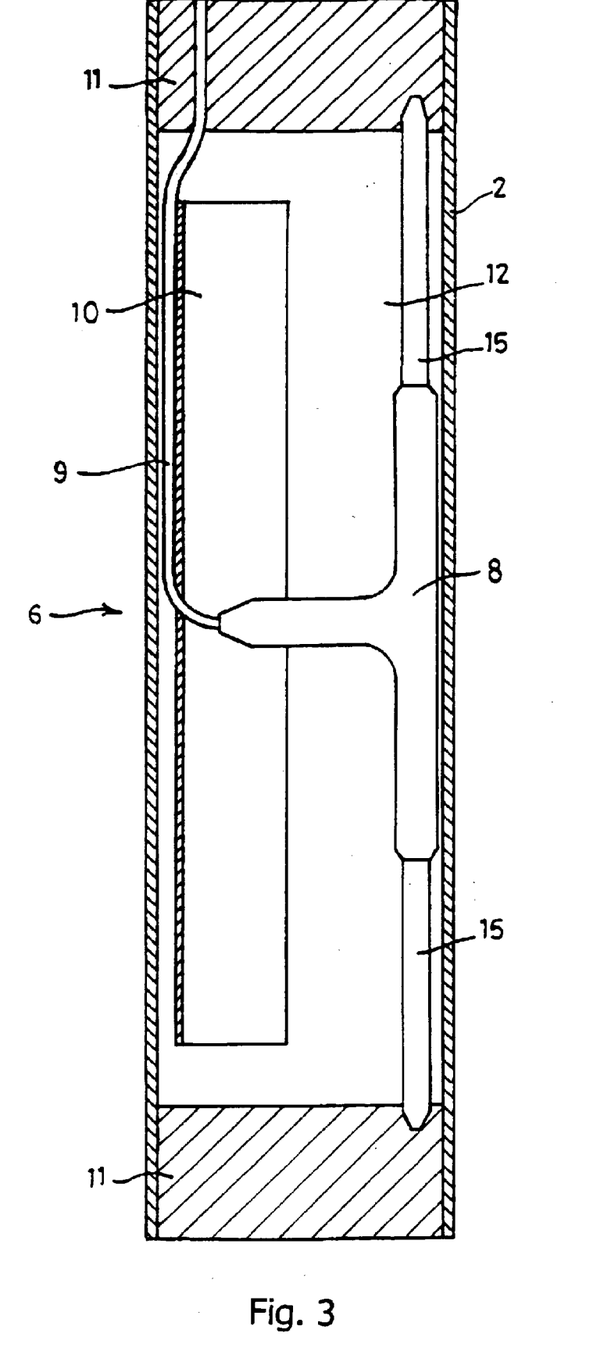
FIG. 3 shows a section in the axial direction of a transmitting section of a borehole radar tool according to the first aspect of the invention, FIGS. 4a, b show a schematic plan view from above and side view, respectively, of an apparatus making use of the method of determining electromagnetic contrast information of the ground.

FIG. 3 depicts a schematic cross section of the transmitting antenna component of a borehole radar tool 1. Here, the dipole antenna 8 (almost) lies against the wall of the housing 2. The antenna 8 is held in the correct position by two suspension brackets 15. The antenna 8 can be driven via cabling 9. Said cabling 9 is located in the space between the reflector 10, located diametrically opposite the transmitting antenna 8, and the wall of the housing 2. 11 indicates insulation material which serves to absorb electromagnetic radiation radiated directly from the transmitting antenna towards the receiving antenna. At the same time, the material 11 serves to secure the suspension brackets 15. The space 12 between the reflector 10 and the transmitting antenna 8 is filled with a dielectric material, in this case water.

In this embodiment, the reflector 10 is not placed entirely against the wall of the housing 2. This provides the advantage, however, that space is provided for the cabling 9 and other components which are sensitive to interference caused by the emitted electromagnetic radiation. Nevertheless, it remains important for the distance between the transmitting antenna 8 and the reflector 10 to remain as large as possible. The same requirement equally applies to the receiving antenna.

Figure 4A:
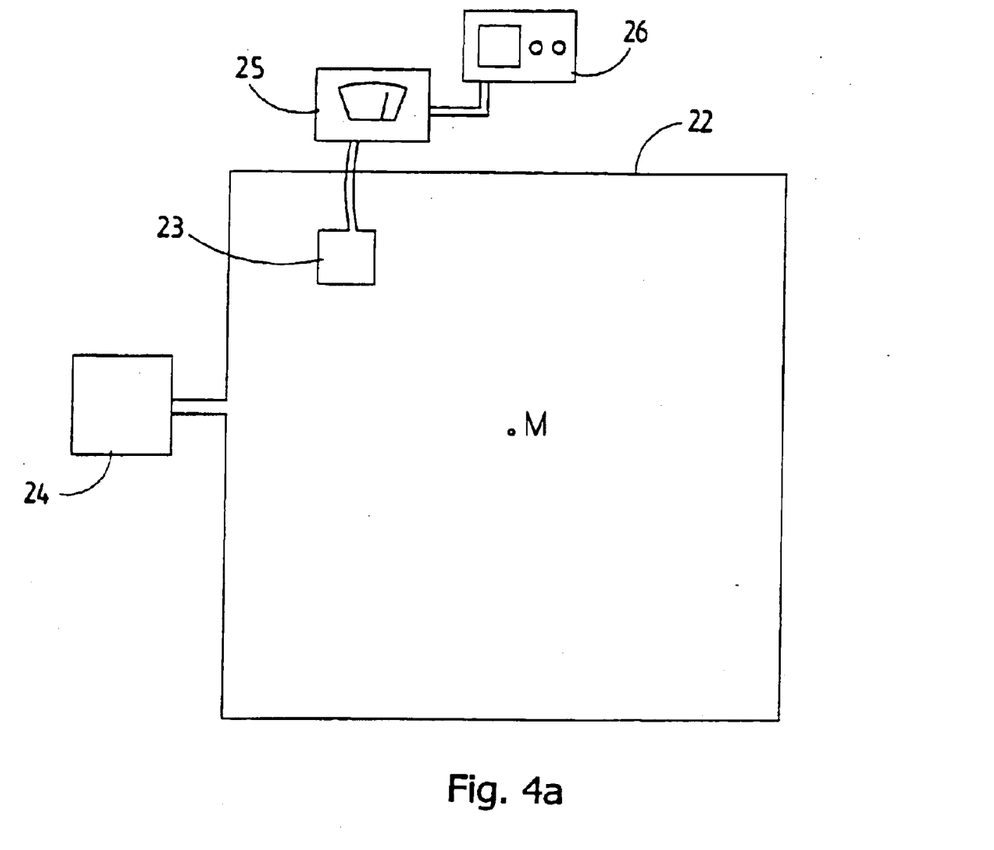
Figure 4B:
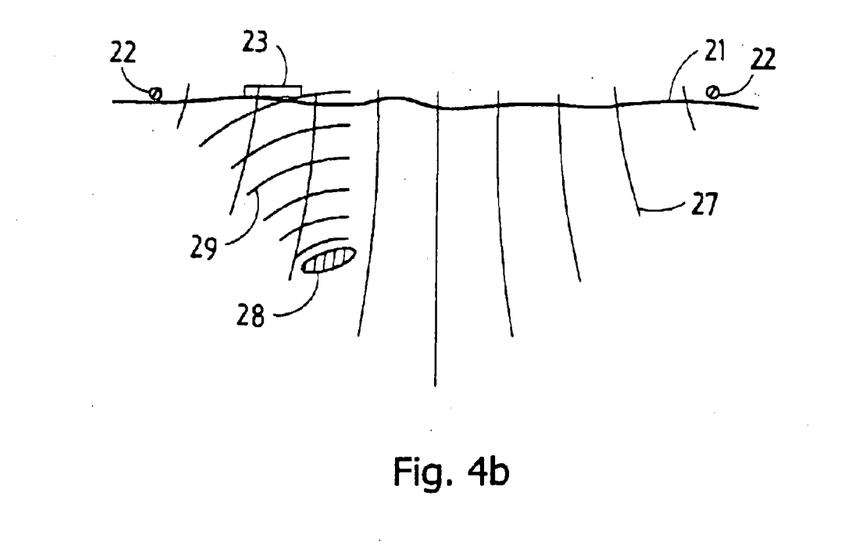

FIGS. 4a and b schematically depict a measurement with the aid of so-called NanoTEM equipment, 21 indicating the earth surface and 22 indicating a tuning coil connected to feed and control equipment 24. Tuning coil 22, for example, is a square having sides of a few meters up to as much as 100 meters, but in principle can be of any desired shape and dimension. 23 indicates a measuring coil which is connected to measuring equipment 25 which can be linked to a processing unit 26.

FIGS. 4a and b and the associated description illustrate the application of the second aspect of the invention when surveying the ground using NanoTEM equipment. If the second aspect of the invention is to be applied to the survey of a pipeline at least partly made of metal for corroded patches, a similar set-up can be used, in which the dimensions of the tuning and/or the measuring coil are tailored to the pipeline to be surveyed. In this case, the tuning coil can be placed on the pipe, the measuring coil being moved along the outside or inside surface of the pipeline.

27 indicates the field lines of a magnetic field generated and emitted by the tuning coil. Induction in item 28 at a position x' turns this into a secondary source of electromagnetic fields 29.

In broad outline, the subsurface measuring device shown works as follows. At a certain, relatively low frequency $\omega_j$, of e.g. 32 Hz, the feed and control equipment 24 generates a square-wave current in the tuning coil 22. As a result, a magnetic field 27 is generated in the tuning coil 22. Said field 27 penetrates the ground underneath tuning coil 22.

At the instant when the direction of the current and therefore also the direction of the magnetic field 27 is reversed, electromagnetic fields 29 are generated in an underground object 28 by induction in said object 28. In other words, object 28 becomes a (secondary) field source. These secondary electromagnetic fields 29 are, in principle, radiated in all directions. Part of these fields is intercepted with the aid of the measuring coil 23, whose centre is located at a position $x_r$. The centre M of the tuning coil 22 is assumed to be $x_s$, the position of the source. The intercepted fields are recorded in the form of an output signal with the aid of the measuring equipment 25 and are optionally further processed by means of a processing unit 26 which may or may not be integrated therein.

In the course of a measurement, a specific strength is set for the vertical component of the magnetic field 27. The measuring coil 23 which is located substantially in its entirety in the plane of the tuning coil 22, in principle measures only the vertical component of the returning fields 29. Other components can be measured too, for example by different orientations of the measuring coil 23.

A set-up of this type can be used, for example, for surveying an unknown portion of the ground, the so-called domain $D^{sc}$. For the purpose of the measuring method used, the domain $D^{sc}$ is usually defined as that portion of the ground which is delimited by the tuning coil 22, being delimited in a downward direction by the sensitivity of the equipment. Alternatively, a known section of the ground can be surveyed to determine the weighting function.

A measurement series can, for example, proceed as follows. First of all, the tuning coil 22, or the transmitter, and the measuring coil 23, or the receiver, are placed in respective positions $x^s_1$ and $x^r_1$. There, a magnetic field 27 is generated by the transmitter 22 and is emitted at one or more frequencies $\omega_j$. It should be noted that frequency in this case in fact refers to the angular frequency, where: angular frequency $\omega_j = 2 \cdot \pi \cdot f$, where f is the "real" frequency in oscillations per second.

The ground and in particular any objects 28 located therein will generate secondary radiation or fields 29. The electromagnetic radiation or fields 29 intercepted from, in principle, all directions by the receiver 23 is measured at a number of frequencies $\omega_j$ and, together with the positional data of the measuring coil 23 relative to the tuning coil 22, is relayed to the processing unit 26.

Then the receiver 23 is moved to different positions, and the measuring step is repeated. These steps are performed a number of times until a desired number of measured data relating to the domain $D^{sc}$ have been determined. The measured data can then be processed, with the aid of an algorithm or method according to the second aspect of the invention, by the processing unit 26 to yield electromagnetic contrast information which can be reproduced as an image of the subsurface, for example on a monitor.

It should be noted in this context that the electromagnetic contrast information cannot be accurately determined with the aid of a measurement in one position, i.e. in one step. This is because the collected information is affected by potentially many, in theory all positions in the domain $D^{sc}$ which are located on a spherical surface. Therefore, the information concerning a particular position x' will depend on, and be determinable only in connection with, the information of all other positions located in the domain on the same spherical surface on which x' is situated. Using the received output signals, in this case for example the vertical component of the received field strength or radiation intensity, it is then possible to determine shape and location of the (secondary) field sources or radiation sources and therefore the desired electromagnetic contrast information.

This inaccuracy can be greatly ameliorated by surveying the positions x' in the domain under different angles. This can be done, for example, by performing the measurements using different positions for the measuring and/or the tuning coil. Thus, the contrast information for a position x' is determined from a large number of overlapping measurements, so that errors are averaged out.

Figure 5:
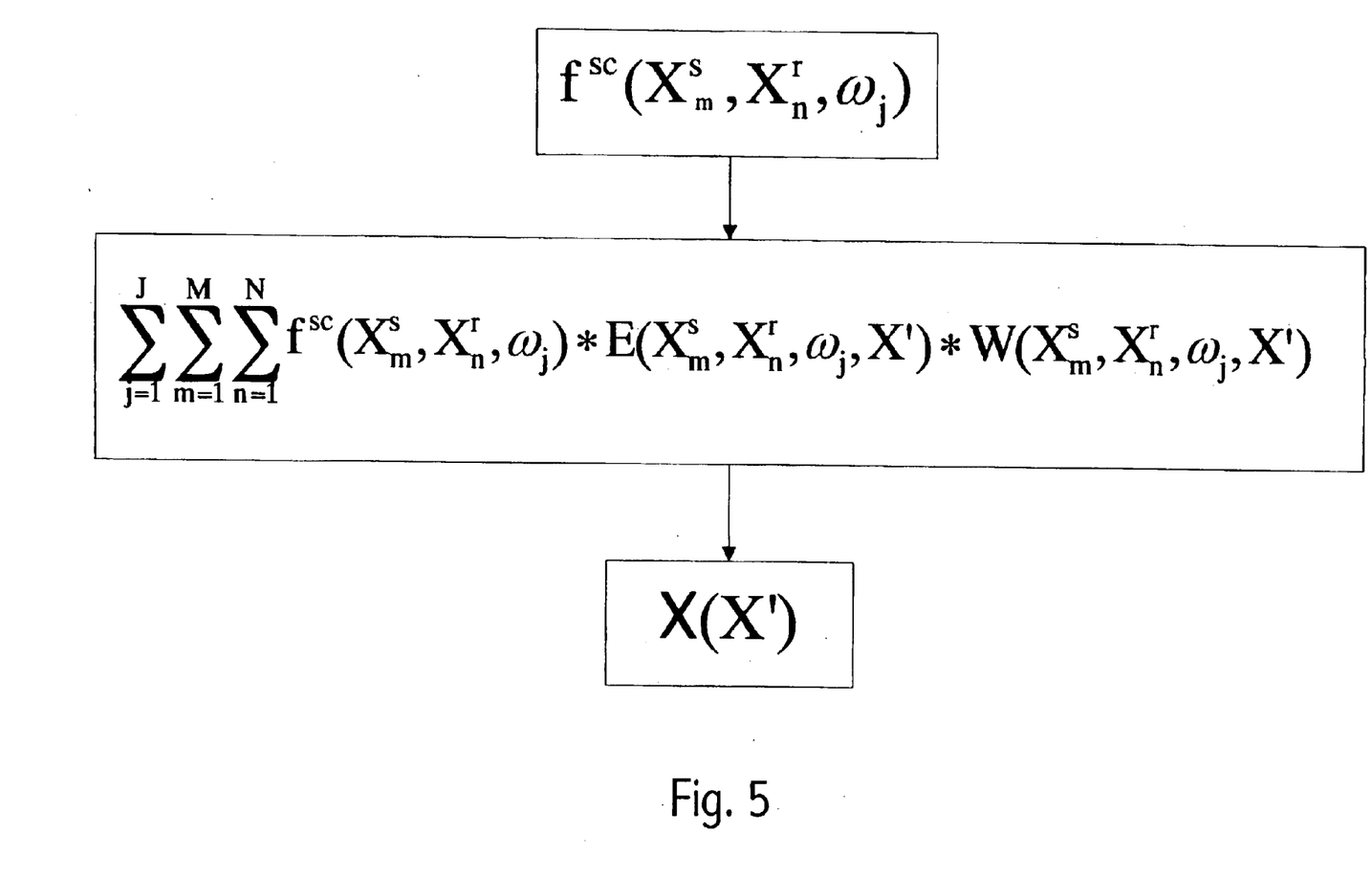
FIG. 5 shows a flow diagram of a method involving an improved algorithm according to the second aspect of the invention for determining electromagnetic contrast information.

FIG. 5 depicts a flow diagram for a method according to the second aspect of the invention for determining electromagnetic contrasts information with the use of a weighting factor W. This starts from a set of measured data $f^{sc}(x^s_m, x^r_n, \omega_j)$, said measured data having been determined with the aid of a known subsurface measuring device, for example the above-described NanoTEM device, for a number of positions $x^s_m$, $x^r_n$ of the transmitter 23 and the receiver 27 and for a number of frequencies $\omega_j$ of the electromagnetic radiation or fields used.

Each of the measured data is then multiplied by a number $E(x^s_m, x^r_n, \omega_j, x')$ and by the applicable weighting factor $W(x^s_m, x^r_n, \omega_j, x')$.

The next step consists of the summation of the resulting products over all transmitter positions $x^s_m$ used, receiver positions $x^r_n$ used and radiation frequencies $\omega_j$ used. This gives the electromagnetic contrast information X(x') of the ground in the domain $D^{sc}(x')$. This contrast information could then be passed, for example, to a monitor or printer unit in order to be interpreted.

Figure 6:
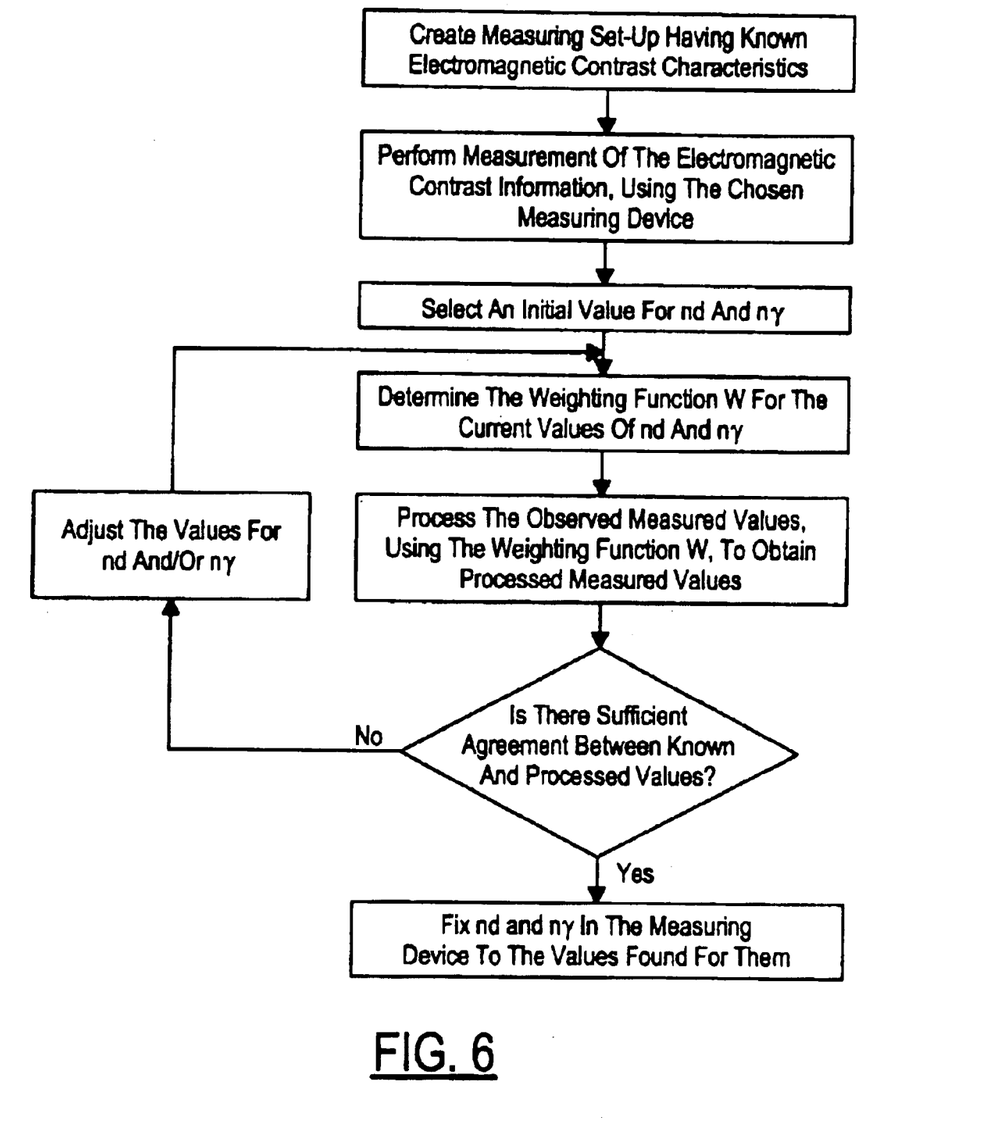
FIG. 6 shows a flow diagram of a method of determining the weighting function applicable for a measuring device according to the second aspect of the invention.

FIG. 6, in a flow diagram, shows a method according to the second aspect of the invention for determining the weighting function applicable to a measuring device.

First of all, a measuring environment or measuring set-up should be provided whose electromagnetic contrast characteristics are known. This can be obtained, for example, by one or more known objects being buried underground in a predetermined manner. Another possibility is to use different, accurate but also, for example, more expensive and slower equipment to carry out a reference measurement in order thus to determine the electromagnetic contrast characteristics of the piece of ground to be surveyed.

In a following step, the measuring device to be adjusted is used to carry out measurements on the measurement environment in order to determine a series of measurement results $f^{sc}$.

Then, values for nd and nγ are selected within the limits specified according to the invention, said values being associated with the measuring device to be adjusted with which the measurements will be carried out.

Then, the observed measurement results are processed by means of an algorithm according to the second aspect of the invention, a weighting function W being determined on the basis of the values selected for nd and nγ, and said weighting function then being used to perform the processing of the series of measured data according to the second aspect of the invention. This results in a series of processed measured data, on the basis of which the electromagnetic contrast characteristics of the measuring set-up studied can be determined.

Then, the observed electromagnetic contrast characteristics are compared with the contrast characteristics known beforehand. If the observed contrast characteristics match the contrast characteristics known beforehand to within the desired accuracy, the procedure has finished. Otherwise, new, adjusted values need to be chosen for nd and nγ, with which the processing step and the comparison step will have to be repeated.

This loop is repeated until agreement is reached to within the desired accuracy between the measured electromagnetic contrast information and that known beforehand.

The values thus found for nd and nγ can then be stored in the measuring device. These values, set only once, depend solely on the type of measuring device and not on the measurement environment chosen (type of the site to be surveyed or the object to be located, etc.).

Figure 7A:
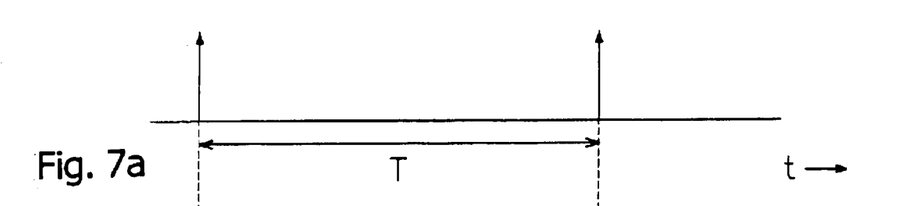
FIGS. 7a, 7b and 7c illustrate diagrams of, respectively, emitted pulse signals, received response signals and the sampling of the response signals over time t according to the third aspect of the invention.
Figure 7B:
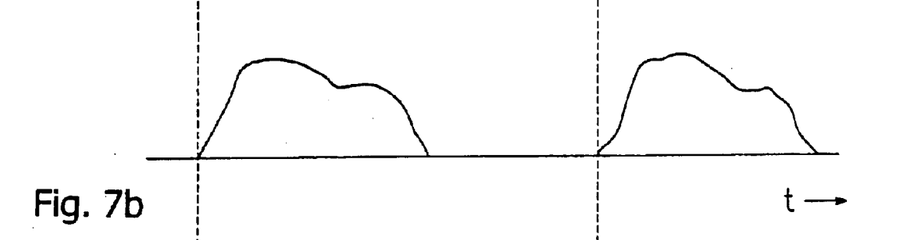
Figure 7C:
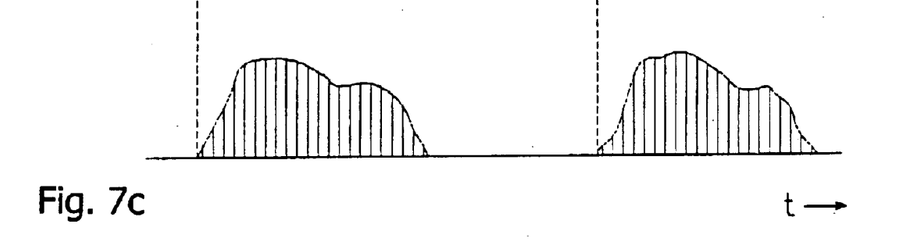

FIG. 7a shows pulse signals which are emitted with a period T of e.g. 1 ms. The duration of each pulse is e.g. 1–50 ns, with a rise time of 1–3 ns. The pulse signals for example have a centre frequency of 50–600 MHz. FIG. 7b, on the same timescale as FIG. 7a, shows response signals which are received in response to the pulse signals according to FIG. 7a. FIG. 7c, on the same timescale as FIGS. 7a and 7b, shows sampling of the response signals according to FIG. 7b.

Figure 8:
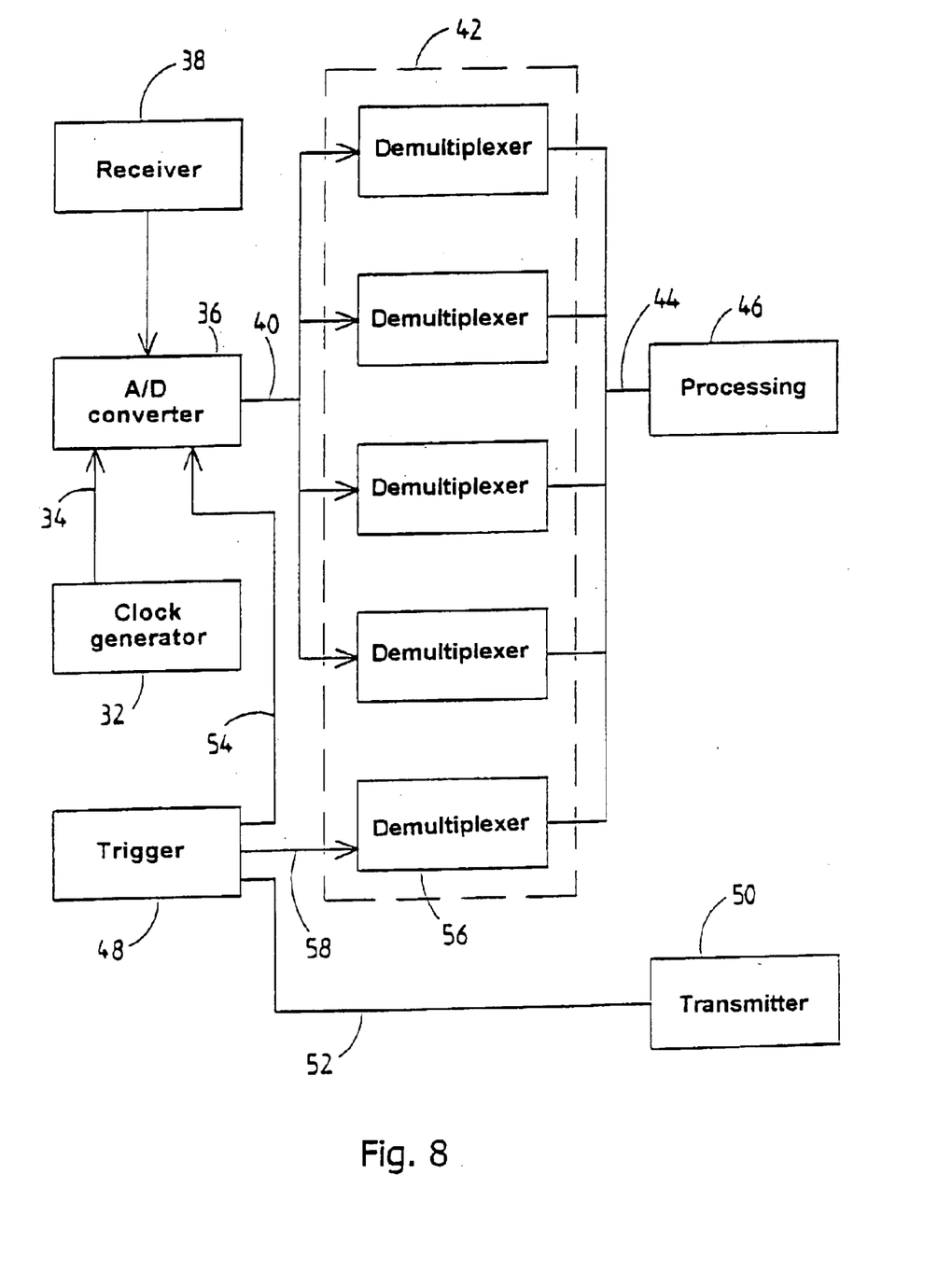
FIG. 8 shows a block diagram of an electronic circuit for implementing the method according to the third aspect of the invention.

FIG. 8 shows a clock generator 32 which is designed to generate a clock signal having a frequency $f_s$ of e.g. 1 kHz. As symbolized by the arrow 4, the clock signal generated by the clock generator 32 is fed to an A/D converter 36 which is designed for sampling, at the clock signal frequency (also referred to as sampling frequency) $f_s$, analog response signals from a receiver 38. The A/D converter 36 converts an analog input voltage into a digital representation, for example a response signal word having a width of 8 bits. In a practical application, the A/D converter 36 can be equipped internally with a demultiplexer (not shown in any detail), which makes it possible for a number of response signal words to be buffered and for n response signal words at a time to emerge at an output of the A/D converter 36, n being an integer equal to or greater than one. The frequency $f_0$ at which the A/D converter 36 supplies digital information is therefore the quotient of the frequency $f_s$ and n. In the specific embodiment of FIG. 8, n=2.

The output 40 of the A/D converter 36 is coupled to a demultiplexer circuit 42, comprising a number of (five in the specific embodiment of FIG. 8) demultiplexers of which four are each able, successively, to buffer a number of response signal words (in the specific embodiment of FIG. 8, four response signal words or 32 bits). At the output 44 of the demultiplexers 42, a data word therefore emerges which comprises a number of response signal words (in the specific embodiment of FIG. 8 sixteen), which data word becomes available at a frequency $f_d$ which corresponds to the quotient of the frequency $f_s$ and the number of response signal words per data word. If it is assumed that in the circuit of FIG. 8 the sampling frequency $f_s$ is 150 MHz, the data word frequency $f_d$ is 9.4 MHz. This frequency $f_d$ can be processed by a processing circuit 46 coupled to the demultiplexers 42.

It will be evident that the length of the data word can be varied by using one or more demultiplexers in or downstream of the A/D converter 36 to select a suitable frequency $f_d$. This opens up the possibility of employing a very fast A/D converter 36 by means of which complete sampling of a response signal within one period thereof is possible.

A trigger circuit 48 generates a trigger signal which is fed to a transmitter 50, as symbolized by a line 52, to generate a pulse signal which is emitted into the subsurface. The transmitter 50 comprises a pulse generator (not shown in any detail) for generating the pulse signals. Interposed between the trigger circuit 48 and the transmitter 50 can be a programmable delay line (not shown) to be able to compensate for delays in the transmitter 50. The trigger signal is also fed to the A/D converter 36, as symbolized by a line 54, preferably via a programmable delay line (not shown), in order to be able to compensate for delays in the receiver 38 and the A/D converter 36. The A/D converter 36 thus receives an instruction to convert the analog pulse signals into digital response signal samples. Finally, the trigger signal is fed to a demultiplexer 56, as symbolized by line 58, to synchronize the output of the data word to the processing circuit 46.

Figure 9:
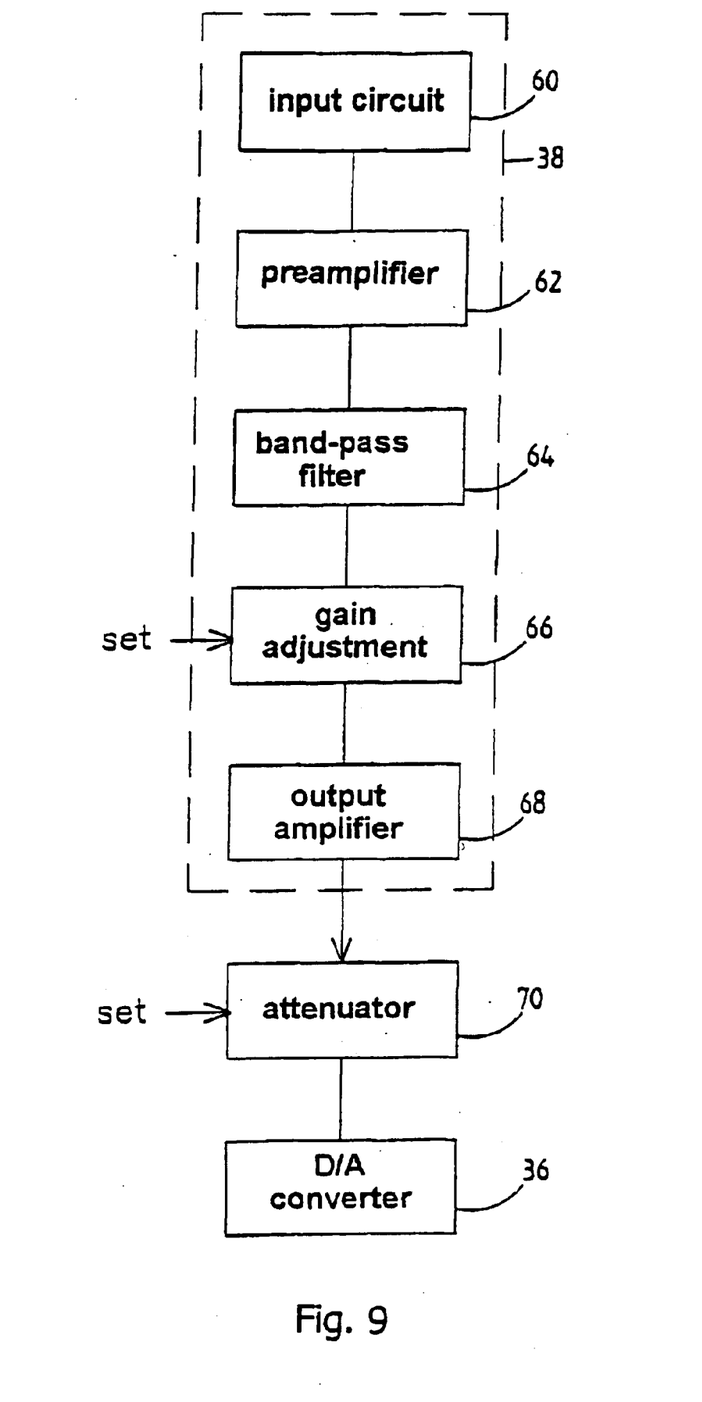
FIG. 9, in a block diagram, shows a section of the circuit of FIG. 8 in greater detail.

As shown in FIG. 9, the receiver 38 includes an input circuit 60, a preamplifier 62, a band-pass filter 64, a gain adjustment circuit 66 adjustable via an input "set", and an output amplifier 68. Preferably interposed between the receiver 38 and the A/D converter 36 is an attenuator 70 which can be adjusted via an input "set" and which sets one of a number of voltage intervals (for example 0–10 mV, 0–20 mV, 0–30 mV, 0–40 mV and 0–50 mV) for the signal from the receiver 38, such that the largest possible amplitude accuracy is obtained, particularly for response signals having a small amplitude, notwithstanding limited accuracy of the A/D converter.

What is claimed is:

1. A borehole radar tool for directionally sensitively locating transitions in the subsurface surrounding the borehole radar tool in use, comprising a generating assembly for generating electromagnetic radiation having a frequency of between 10 MHz and 200 MHz, signal processing means for processing received electromagnetic radiation, and a housing having a substantially cylindrical wall and a central axis which accommodates at least:

a transmitting antenna assembly for emitting the electromagnetic radiation generated by the generating assembly, comprising a transmitting antenna and an electroconductive reflector; and a receiving antenna assembly for receiving the electromagnetic radiation reflected by the surrounding subsurface, comprising a receiving antenna and an electroconductive reflector, wherein both the transmitting antenna and the receiving antenna extend parallel to the axis of the housing and both comprise a dipole antenna, each reflector comprising a reflective surface which extends abreast of and parallel to the respective dipole antenna at a distance therefrom, and a space between each reflective surface and that section of the housing which in each case is located opposite thereto being filled with a medium having a dielectric constant of at least 10, wherein the transmitting antenna and receiving antenna extend near the wall of the housing and in that at least that section of the reflector which is located diametrically opposite the transmitting antenna and receiving antenna, respectively, likewise extends near the wall of the housing.

2. The borehole radar tool according to claim 1, wherein at least one of the reflectors forms part of the wall of the housing.

3. The borehole radar tool according to claim 1, wherein at least one of the reflectors comprises a thin plate.

4. The borehole radar tool according to claim 1, wherein at least one reflective surface is a substantially smoothly curved surface which, as seen in the axial direction of the housing, at least substantially forms part of a conic.

5. The borehole radar tool according to claim 4, wherein the conic is a circle having a radius which is substantially equal to half the inside diameter of the housing.

6. The borehole radar tool according to claim 5, wherein the angle formed by at least one of the reflectors is between 45° and 180°.

7. The borehole radar tool according to claim 5, wherein the angle formed by at least one of the reflectors is between 145° and 155°.

8. The borehole radar tool according to claim 4, wherein the conic is a parabola.

9. The borehole radar tool according to claim 1, wherein the dielectric in the space between the reflective surfaces and that section of the wall of the housing which in each case is located opposite thereto has a dielectric constant of between 20 and 100.

10. The borehole radar tool according to claim 1, wherein the dielectric in the space between the reflective surfaces and that section of the wall of the housing which in each case is located opposite thereto has a dielectric constant of between 60 and 100.

11. The borehole radar tool according to claim 9, wherein the dielectric substantially comprises water.

* * * * *

UNITED STATES PATENT AND TRADEMARK OFFICE
CERTIFICATE OF CORRECTION

PATENT NO. : 6,712,140 B2
DATED : March 30, 2004
INVENTOR(S) : Michiel Sebastiaan Van Oers et al.

It is certified that error appears in the above-identified patent and that said Letters Patent is hereby corrected as shown below:

Title Page,
Item [54], Title, delete "3RD BOREHOLE RADAR ANTENNA AND ALGORITHM, METHOD AND APPARATUS FOR SUBSURFACE SURVEYS" and insert -- 3D BOREHOLE RADAR ANTENNA AND ALGORITHM, METHOD AND APPARATUS FOR SUBSURFACE SURVEYS --.

Signed and Sealed this

First Day of June, 2004

JON W. DUDAS
*Acting Director of the United States Patent and Trademark Office*